United States Patent [19]

Besemann

[11] Patent Number: 4,842,125

[45] Date of Patent: Jun. 27, 1989

[54] APPARATUS FOR TRANSPORTING STACKS OF PAPER SHEETS AND THE LIKE

[75] Inventor: Alfred Besemann, Hamburg, Fed. Rep. of Germany

[73] Assignee: E.C.H. Will GmbH, Hamburg, Fed. Rep. of Germany

[21] Appl. No.: 175,162

[22] Filed: Mar. 30, 1988

[30] Foreign Application Priority Data

Apr. 6, 1987 [DE] Fed. Rep. of Germany ....... 3711584

[51] Int. Cl.⁴ .................... B65G 47/26; B65G 43/00; B65G 47/22
[52] U.S. Cl. ................. 198/457; 198/464.2; 198/468.11; 198/493
[58] Field of Search ............... 198/457, 464.2, 468.11, 198/493, 811; 271/176, 177, 184, 194, 269, 276; 414/903

[56] References Cited

U.S. PATENT DOCUMENTS

| 2,681,130 | 6/1954 | Atwood | 198/464.2 |
| 2,859,863 | 11/1958 | Wallin | 198/811 |
| 3,096,871 | 7/1963 | Anderson | 198/464.2 |
| 3,329,469 | 7/1967 | Stadelman | 198/493 |
| 3,822,777 | 7/1974 | Jepsen | 198/457 |
| 4,078,489 | 3/1978 | Davis | 271/184 X |
| 4,311,230 | 1/1982 | Crawford et al. | 198/457 |
| 4,386,641 | 7/1983 | Horn | 198/457 X |

FOREIGN PATENT DOCUMENTS 0558649  6/1958  Canada ............................. 198/811
0691194  7/1965  Italy ................................. 198/457

Primary Examiner—Andres Kashnikow
Assistant Examiner—Timothy Newholm
Attorney, Agent, or Firm—Peter K. Kontler

[57] ABSTRACT

Apparatus for transporting stacks of paper sheets has a first conveyor which delivers stacks in a first direction, a second conveyor which removes stacks in a second direction at right angles to the first direction, and a transfer conveyor having an endless foraminous band which is disposed between the discharge end of the first conveyor and the receiving end of the second conveyor and is operated intermittently to accept stacks from the first conveyor or to deliver stacks onto or toward the second conveyor. The upper reach of the endless band is located above several rows of nozzles which can discharge streams of compressed air to cause a stack to levitate during transfer onto the band or during removal from the band while the transfer conveyor is at a standstill. The first conveyor delivers stacks onto the band while the band is idle and while the nozzles discharge air, and the band is driven (while the nozzles are shut off from a source of compressed air) when the stack or stacks are to be transferred onto the second conveyor. Alternatively, the band is driven jointly with the first conveyor to receive stacks and is then arrested while the second conveyor receives one or more stacks which levitate above the transfer conveyor and are pushed onto the second conveyor by an additional conveyor or by a hand-held implement.

14 Claims, 2 Drawing Sheets

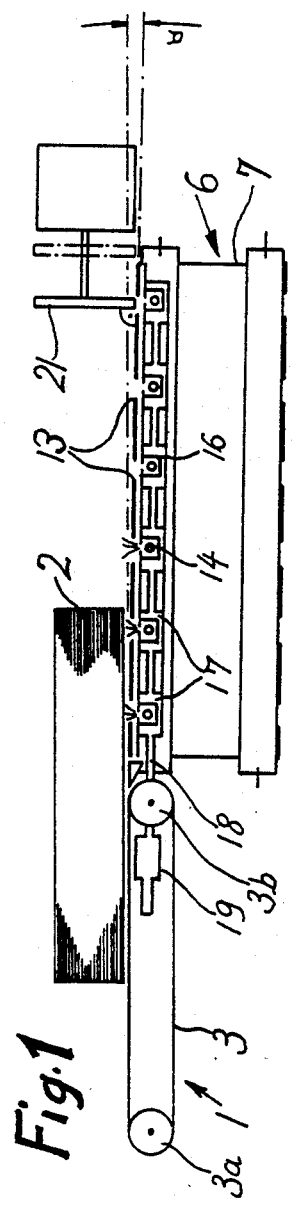
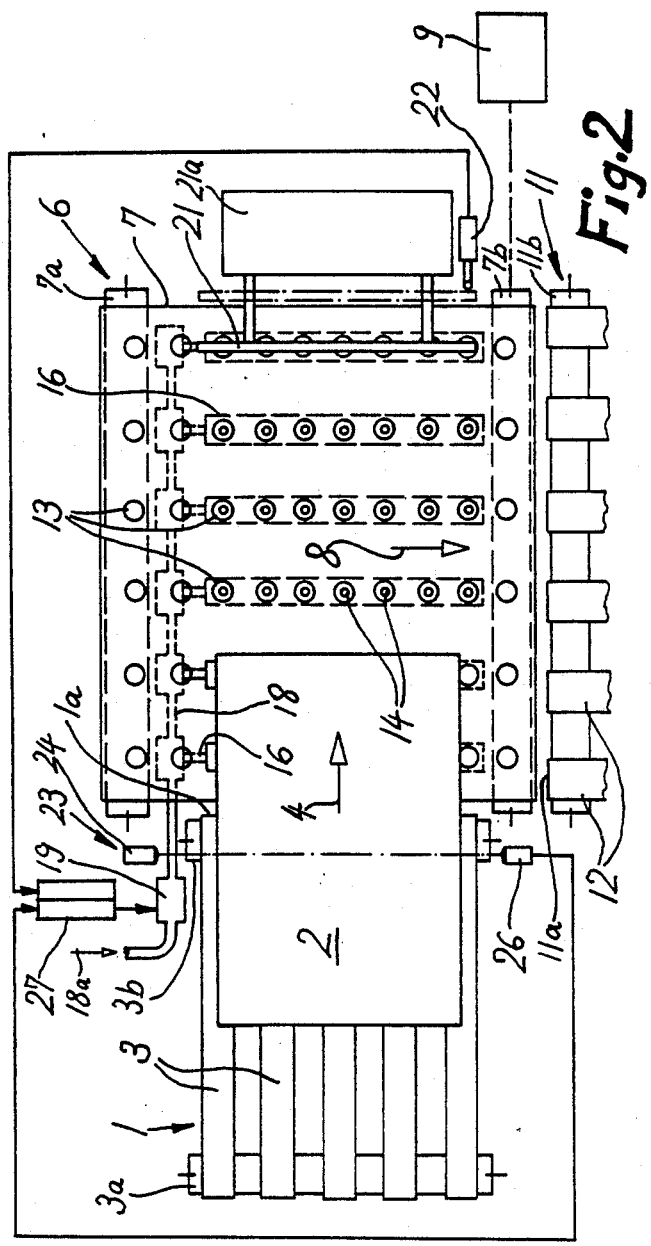

APPARATUS FOR TRANSPORTING STACKS OF PAPER SHEETS AND THE LIKE

BACKGROUND OF THE INVENTION

The invention relates to apparatus for transporting commodities along paths wherein the commodities are caused to change the direction of travel. More particularly, the invention relates to improvements in apparatus which are especially suited for the transport of commodities in the form of stacks of superimposed sheets of paper, cardboard, metallic or plastic foil or combinations of such materials. The term "stacks" is intended to denote larger or smaller piles of superimposed or overlapping sheets or panels, as well as individual sheets or panels.

It is often necessary to transport stacks of paper sheets and the like in such a way that the stacks are delivered from a gathering or like machine in a given direction and must thereupon change the direction of their travel, normally or often at right angles to the given direction. For example, such changes in the direction of transport of stacks are or can be necessary in order to take advantage of the space which is available in a plant, e.g., in an establishment wherein larger sheets of paper or the like are subdivided into smaller sheets and the smaller sheets are assembled into stacks which are thereupon introduced into boxes or into other types of receptacles.

OBJECTS AND SUMMARY OF THE INVENTION

An object of the invention is to provide a novel and improved apparatus which can transport large numbers of stacks of paper sheets and the like per unit of time, and which can transport the stacks gently so that the positions of neighboring sheets in the stack remain unchanged.

Another object of the invention is to provide an apparatus which can transport stacks in several directions without affecting the appearance and/or other desirable characteristics of the lowermost sheet or sheets of the stacks.

A further object of the invention is to provide a sheet processing machine which embodies the above outlined apparatus.

An additional object of the invention is to provide novel and improved means for effecting a change of the direction of advancement of stacks in the above outlined apparatus.

Still another object of the invention is to provide the apparatus with novel and improved means for automatically correcting the orientation of stacks and/or their sheets or panels prior to actually changing the direction of advancement of the stacks.

A further object of the invention is to provide the apparatus with novel and improved pneumatic lifting means for stacks of paper sheets and the like.

An additional object of the invention is to provide the apparatus with novel and improved means for saving compressed gaseous fluid which is used to lift stacks of paper sheets or the like in the region where the direction of advancement of the stacks is to be changed.

Another object of the invention is to provide the apparatus with novel and improved means for preventing creasing, curling, wrinkling and/or other undesirable changes of shape of the lowermost sheets of stacks which are transported along a path wherein they are compelled to change the direction of advancement, particularly in such a way that they leave the path in a direction at right angles to the direction of entering the path.

The invention is embodied in an apparatus for transporting commodities, particularly stacks of paper sheets and the like. The apparatus comprises a first conveyor (e.g., an endless belt conveyor having a substantially horizontal upper reach) which serves to advance successive commodities in a first direction and has a discharge end, a second conveyor (e.g., a second endless belt conveyor) which serves to advance commodities in a second direction substantially at right angles to the first direction and has a receiving end, a transfer conveyor (e.g., a wide endless band conveyor) which is adjacent the discharge end of the first conveyor and the receiving end of the second conveyor and serves to receive commodities from the first conveyor and to advance commodities in one of the first and second directions, means for intermittently driving the transfer conveyor in the one direction, and pneumatic lifting means which is activatable to raise or lift the commodities off the transfer conveyor while the driving means is idle (i.e., deactivated).

The lifting means can include a series of successively activatable lifting units which are disposed one after the other in the first direction, and means for activating successive lifting units of the series while the first conveyor advances a commodity beyond its discharge end so that successive increments of such commodity are held in a raised position while advancing onto the transfer conveyor. In such instance, the one direction is the second direction. The apparatus preferably further comprises monitoring means which generates signals on arrival of a commodity at the discharge end (e.g., when the leader or foremost portion of such commodity reaches the discharge end) of the first conveyor, and means for activating the lifting means in response to signals from the monitoring means. This entails savings in compressed gaseous fluid which is used to cause the commodities to levitate above the transfer conveyor.

The transfer conveyor can comprise an endless foraminous band with an upper reach which receives commodities from the first conveyor. The aforementioned lifting units include nozzles which are disposed beneath the upper reach of the endless band and are activatable to direct streams or jets of compressed gaseous fluid (e.g., air) upwardly through the upper reach while the means for driving the transfer conveyor is idle. If the transfer conveyor is designed to advance commodities in the second direction, each of the aforementioned lifting units can comprise a row of nozzles which extends in substantial parallelism with the second direction and the neighboring rows of nozzles are spaced apart from each other in the first direction. The endless band which constitutes or forms part of the transfer conveyor can comprise rows of apertures, and each nozzle registers with an aperture when the driving means is idle. The lifting means can further comprise a source of pressurized gaseous fluid and a discrete valve for each row of nozzles. The valves are indirectly connected with the source of pressurized gaseous fluid and are operable to admit pressurized fluid to the nozzles of the respective rows. The lifting means can further comprise a master valve which is interposed between the source and the discrete valves. The master valve can be opened by the aforementioned monitoring means in response to advancement of a commodity beyond the discharge end of the first conveyor. The rows of nozzles are disposed at different distances from the discharge end of the first conveyor, and the valves for successive rows of nozzles are operative to admit gaseous fluid to the nozzles of the respective rows when at least some nozzles of the preceding row (as seen in the first direction) are overlapped by a commodity which advances in the first direction.

A stop can be provided in the path of advancement of commodities in the first direction above the transfer conveyor, and such apparatus preferably further comprises means for activating the driving means for the transfer conveyor on engagement of a commodity with the stop. The stop is preferably yieldable in the first direction (e.g., against the opposition of one or more springs and/or a compressible fluid) and is moved in the first direction by a commodity which is located above the transfer conveyor. The activating means of such apparatus can include means for starting or activating the driving means in response to movement of the stop through a predetermined distance in the first direction.

The transfer conveyor preferably slopes downwardly in a first direction.

If the transfer conveyor is arranged to be driven in the first direction, the driving means can include means for jointly driving the first conveyor and the transfer conveyor in the first direction so that a commodity which has been delivered onto the first conveyor is transferred onto the transfer conveyor while the lifting means is idle, and such apparatus then preferably further comprises an additional conveyor which serves to move commodities off the transfer conveyor and onto the second conveyor while the transfer conveyor is idle and the lifting means is activated to maintain the commodity or commodities above the transfer conveyor out of contact with the transfer conveyor. The additional conveyor can include a manually or motor-operated pusher which is reciprocable in and counter to the second direction. In order to save compressed gaseous fluid, the lifting means of such apparatus is preferably designed to discharge compressed gaseous fluid against the underside of that portion of each commodity which still overlies the transfer conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

FIG. 1 is a schematic elevational view of an apparatus which embodies a first form of the invention and wherein the transfer conveyor is designed to advance successive commodities in the second direction;

FIG. 2 is a plan view of the apparatus which is show in FIG. 1; and

DESCRIPTION OF THE PREFERRED EMBODIMENTS

Figure 3:
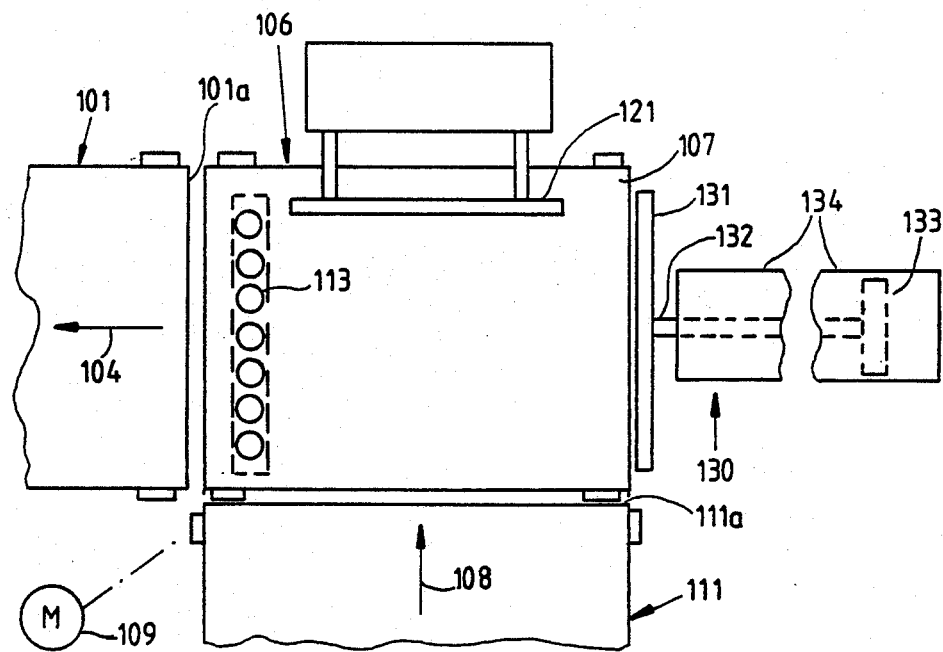
FIG. 3 is a schematic plan view of a modified apparatus wherein the transfer conveyor is operative to advance commodities in the first direction and an additional conveyor is provided to move commodities off the transfer conveyor.

The apparatus which is shown in FIGS. 1 and 2 serves to transport a succession of stacks 2 of paper sheets or the like along a path having a first portion extending in the direction of arrow 4 and a second portion extending in the direction of arrow 8, i.e., at right angles to the first portion. The apparatus comprises a first conveyor 1 having a discharge end at 1a, a second conveyor 11 having a receiving end at 11a, and a third or transfer conveyor 6 between the discharge end 1a and the receiving end 11a. The first conveyor 1 comprises a plurality of relatively narrow endless belts 3 which are trained over a rear pulley 3a and a front pulley 3b; the latter pulley is disposed at the discharge end 1a of the conveyor 1. A motor (not specifically shown) is provided to drive at least one of the pulleys 3a, 3b, either continuously or discontinuously, so that the horizontal or nearly horizontal upper reach of the conveyor 1 advances in the direction of arrow 4. The transfer conveyor 6 comprises a relatively wide endless foraminous band 7 and one of its sides is closely or immediately adjacent the discharge end 1a. The endless band 7 is trained over pulleys 7a, 7b and the pulley 7b can be intermittently driven by a suitable motor 9, namely as soon as a stack 2 on the conveyor 6 assumes a predetermined optimum position for transfer onto the second conveyor 11. The conveyor 11 is similar to the conveyor 1; it comprises a plurality of relatively narrow parallel endless belts 12 trained over a first pulley 11b at the receiving end 11a and over at least one additional pulley, not shown. The pulley 11b and/or another pulley for the belts 12 can be driven by the motor 9 simultaneously with the pulley 7b, or by a discrete motor. The arrangement may be such that the conveyor 11 is set in motion simultaneously with the conveyor 6 or that the conveyor 11 is driven without interruptions. The direction of advancement of the upper reaches of the belts 12 forming part of the second conveyor 11 is indicated by the arrow 8.

The endless band 7 of the transfer conveyor 6 has several parallel rows of apertures 13 in the form of circular holes. Each row of apertures 13 is parallel to the direction which is indicated by the arrow 8, and successive rows of apertures 13 (as seen in the direction of arrow 4) are disposed at different distances from the discharge end 1a of the first conveyor 1. When the conveyor 6 is at a standstill, each aperture 13 in the upper reach of the endless band 7 registers with the orifice or orifices of a nozzle 14 in the space between the upper and lower reaches of the band 7. The nozzles 14 form several rows, the same as the apertures 13 and are connected to conduits 16 extending in parallel with the direction which is indicated by the arrow 8. The intake end of each conduit 16 contains a discrete pressure-responsive valve 17, and these valves are connected to each other in series by a further conduit 18 containing a master valve 19. The receiving end of the conduit 18 is connected with a suitable source of pressurized gaseous fluid (e.g., air); such source is indicated schematically by an arrow 18a and can constitute an air compressor, a blower or the like.

The transfer conveyor 6 cooperates with a stop or abutment 21 which is biased by one or more springs (in a housing 21a) counter to the direction indicated by the arrow 4 so that it normally assumes the extended position which is shown by solid lines. When the stop 21 is engaged by the leading edge of an oncoming stack 2, it yields in the direction of arrow 4 and moves toward the retracted position which is indicated by phantom lines. At such time, a monitoring device 22 (e.g., a mechanical sensor or a proximity detector) transmits a signal which can be used to start the motor 9 so as to set the conveyor 6 (and preferably also the conveyor 11) in motion in the direction of arrow 8. The bias of the spring or springs in the housing 21a is preferably selected in such a way that the stop 21 provides a gentle gradual braking action with simultaneous change of orientation of the oncoming stack 2 (if necessary) so that the stack is ready to be moved off the conveyor 6 and onto the second conveyor 11. The arrangement may be such that the stop 21 changes (when necessary) the orientation of individual sheets in the oncoming stack 2 and/or the orientation of the entire stack on the conveyor 6.

The apparatus further comprises means 23 for monitoring the progress of the leading edge or foremost portion of a stack 2 on the first conveyor 1 and for generating signals when the leading edge is sufficiently close to the discharge end 1a to warrant an opening of the master valve 19 as well as of the leftmost valve 17, i.e., the admission of compressed gaseous fluid into the leftmost row of nozzles 14. At such time, the transfer conveyor 6 is idle and each aperture 13 in the upper reach of its endless band 7 registers with the orifice or orifices of one of the nozzles 14. The illustrated monitoring means 23 comprises a radiation source 24 at one side of the conveyor 1 in the region of the discharge end 1a, and a signal generating transducer 26 is located at the other side of the conveyor 1 in the path of propagation of radiation from the source 24. When the beam of radiation is interrupted by the leading portion of a stack 2 on the conveyor 11, the transducer 26 transmits a signal to the corresponding input of a flip-flop circuit 27 whose output then transmits a signal to open the master valve 19. The monitoring device 22 is connected to another input of the circuit 27, and its signals cause the circuit 27 to effect a closing of the master valve 19 so that the nozzles 14 are sealed from the source 18a of compressed gaseous fluid. The flip-flop circuit 27 can be replaced with other suitable means for activating and deactivating the master valve 19, and the monitoring device 23 can be located at a distance upstream of the discharge end 1a of the conveyor 1 if the signals from the transducer 26 are adequately delayed so that they reach the corresponding input of the circuit 27 in proper time for opening of the master switch 19 so that the leftmost row of nozzles 14 will begin to discharge jets or streams of compressed gaseous fluid as soon as such nozzles are overlapped by the foremost portion of the lowermost sheet of the stack 2 which is in the process of advancing onto the transfer conveyor 6. Analogously, the position of the monitoring device 22 can be changed, as long as this device can effect a closing of the master valve 19 when the deceleration and reorientation (if necessary) of the stack 2 on the conveyor 6 is completed.

The mode of operation of the apparatus of FIGS. 1 and 2 is as follows:

The conveyor 1 receives successive stacks 2 from a machine (not shown) wherein individual sheets are gathered into stacks. When a stack 2 reaches a position in which its leader interrupts the beam of radiation issuing from the radiation source 24 of the monitoring device 23, the transducer 26 of the monitoring device 23 transmits a signal which causes the flip-flop circuit 27 to open the master valve 19 so that the latter enables the conduit 18 to admit pressurized fluid from the source 18a to the leftmost valve 17. This valve then opens and enables the pressurized fluid to enter the corresponding row of nozzles 14 not later than when the foremost portion of the lowermost sheet of the stack 2 reaches a position above the corresponding row of apertures 13 in the upper reach of the band 7. At such time, the transfer conveyor 6 is idle and each aperture 13 in the upper reach of the band 7 registers with a nozzle 14. The master valve 19 can constitute a solenoid-operated valve of conventional design. The valves 17 are responsive to dynamic pressure in the upstream portions of the conduit 18, and the setting of the leftmost valve 17 is such that it opens automatically following opening of the master valve 19. The streams of air which issue from the leftmost row of nozzles 14 and pass through the registering apertures 13 of the band 7 impinge upon the underside of the advancing stack 2 and cause the lowermost sheet of the stack to levitate; at the very least, friction between the underside of the lowermost sheet of the stack 2 and the band 7 is reduced to a minute fraction of friction which would develop in the absence of pneumatic lifting means including the lifting units composed of the nozzles 14, the valves 17, the conduits 16, 18, the master valve 19 and the source 18a. It has been found that the transfer of foremost portion of the underside of a stack 2 which advances beyond the discharge end 1a of the conveyor 1 is gentle and takes place in such a way that the lowermost sheet or sheets of the stack which advances in the direction of the arrow 4 are not wrinkled and/or otherwise adversely affected as a result of advancement onto the transfer conveyor 6. On the contrary, the lowermost sheet or sheets remain fully stretched, the same as the sheets above them. The distance of the lifting unit including the leftmost row of nozzles 14 from the discharge end 1a of the conveyor 1 is selected in such a way that the cushion of gas which is formed by streams issuing from the corresponding apertures 13 is effective as soon as the foremost part of the underside of the advancing stack reaches the adjacent side of the band 7.

As the underside of the advancing stack 2 begins to overlie the leftmost row of apertures 13 in the band 7, the pressure of fluid in the leftmost conduit 16 rises, and such pressure is propagated into the conduit 18 and therein to the next (namely next-to-the-leftmost) valve 17 which opens automatically and admits pressurized gaseous fluid into the next lifting unit including the second row of nozzles 14 in good time to ensure that the entire underside of that part of the lowermost sheet of the stack 2 which overlies the band 7 is caused to levitate and to be in minimal or zero frictional engagement with the band 7. The cushion of gaseous fluid which is formed by streams of fluid issuing from successive rows of nozzles 14 widens toward the stop 21 at the rate at which the leader of the stack 2 advances toward the stop 21 because the third valve 17 opens when the pressure in the second leftmost conduit 16 rises, the fourth valve 17 opens when the pressure in the third leftmost conduit 16 rises, and so forth.

The stack 2 advances in the direction of arrow 4, first under the action of the belts 3 and thereupon by inertia, to reach and depress the stop 21. When the stop 21 reaches the phantom-line (retracted or depressed) position of FIGS. 1 and 2, the change of orientation (if necessary) of the stack 2 is already completed, and the stack comes to a halt at the time the monitoring device 22 transmits to the flip-flop circuit 27 a signal to close the master valve 19 and to thus terminate the admission of compressed gaseous fluid to the nozzles 14. The signal from the monitoring device 22 can be used to start (e.g., with a required delay) the motor 9 for the conveyor 11 and/or conveyor 6 so that the properly oriented stack 2 begins to advance in the direction of arrow 8 and is transferred onto the belts 12 of the conveyor 11 to be transported to a further processing station, e.g., to a packing station. The underside of the stack 2 is in full frictional engagement with the upper reach of the band 7 when the conveyor 6 is set in motion in the direction of arrow 8 so that the stack moves with the band 7 without slipping and is transferred onto the belts 12 of the conveyor 11 in a highly predictable manner. The stop 21 reassumes the extended position which is shown in full lines as soon as the stack 2 has advanced beyond its lower edge (as seen in FIG. 2).

FIG. 1 shows that the upper reach of the band 7 slopes downwardly from the discharge end 1a of the conveyor in the direction of the arrow 4. The relatively small angle ($\alpha$) of such inclination of the upper reach of the band 7 with reference to the upper reach of the conveyor 1 can be in the range of one or more degrees. Such downward sloping of the upper reach of the band 7 in the direction of arrow 4 is desirable and advantageous when the apparatus is arrested while a stack assumes a position corresponding to that of the stack 2 shown in FIGS. 1 and 2 namely partly on the conveyor 1 and partly at a level above the upper reach of the band 7. It has been found that the stack 2 begins to move in the desired direction (arrow 4) in a highly predictable fashion as soon as the conveyor 1 is restarted to advance the stack further on toward the stop 21.

The pressure-responsive valves 17 are or can be of conventional design. Such valves are available on the market. For example, each such valve can have a membrane which is deformed in response to rising fluid pressure in the immediately adjacent upstream portion of the conduit 18 so that the deformed membrane permits pressurized fluid to flow on toward the next valve 17 (as seen in the direction of arrow 4).

An advantage of the valves 17 is that they enable the apparatus to operate properly without consuming large quantities of compressed gaseous fluid, i.e., these valves ensure that compressed gaseous fluid is discharged only by those nozzles 14 which are overlapped by the lowermost sheet of a stack 2 which is in the process of advancing over the conveyor 6 and toward and thereupon with the stop 21. The motor 9 is designed to bring the conveyor 6 to a halt in any one of a number of positions in each of which each nozzle 14 registers with an aperture 13 in the upper reach of the band 7.

The stop 21 constitutes an optional but desirable feature of the improved apparatus. This stop ensures that the sheets of the stack 2 on the conveyor 6 are properly aligned with one another as well as that the entire stack 2 on the conveyor 6 is properly oriented before the stack ceases to levitate as a result of closing of the valve 19 and the motor 9 is set in motion to drive the upper reach of the band 7 in the direction of arrow 8. The monitoring device 22 is or can be designed to close the master valve 19 via flip-flop circuit 27 in immediate response to requisite depression of the stop 21 against the opposition of the spring or springs in the housing 21a. This brings about savings in compressed gaseous fluid.

An important advantage of the improved apparatus is that successive stacks of paper sheets or the like can reach the conveyor 11 in a predetermined optimum orientation as well as that the change of direction of advancement is effected without any defacing of and/or other damage to the lowermost sheet or sheets of the stacks which advance onto and thereupon off the transfer conveyor 6. The apparatus can be used to advance rows of two or more aligned stacks which are advanced by the conveyor side-by-side and then form a file of successive stacks during transport off the conveyor 6.

FIG. 3 shows a portion of a modified apparatus wherein the transfer conveyor 106 is in motion while it receives stacks from a first conveyor 111 and is at a standstill while a stack is transferred from its endless band 107 onto the receiving conveyor 101. The conveyor 111 delivers stacks in the direction of arrow 108, and the conveyor 101 removes stacks in the direction of arrow 104. The construction of the transfer conveyor 106 is or can be identical with that of the conveyor 6, but the position of the stop 121 is changed. The conveyor 106 is located between the discharge end 111a of the conveyor 111 and the receiving end 101a of the conveyor 101. The rows of nozzles (not specifically shown in FIG. 3) beneath the rows of apertures 113 extend in the direction of the arrow 108 and at right angles to the direction which is indicated by arrow 104. In order to save compressed gaseous fluid, successive rows of nozzles are sealed from the source of compressed gas, starting with the row which is most remote from the receiving end 101a and proceeding downward the conveyor 101. The pneumatic lifting means of the apparatus which is shown in FIG. 3 is idle while the conveyor 106 is in motion to receive one or more stacks from the conveyor 111, and all of the nozzles discharge streams of compressed air when the conveyor 106 is arrested and the stack or stacks are to be transferred from the conveyor 106 onto the conveyor 101. Such transfer can be carried out by a manually operated pusher (not shown) or by an additional conveyor 130 having a plate-like pusher 131 which is reciprocable in and counter to the direction of arrow 104 and is connected to a piston rod 132 extending into an elongated double-acting cylinder 134 of the conveyor 130 and connected to a piston 133. The means for admitting a working fluid into and for effecting evacuation of such fluid from the chambers at opposite sides of the piston 133 in the cylinder 134 may be of conventional design and are not shown in FIG. 3. The conveyors 106, 101 can be driven by a motor 109.

It is clear that the apparatus of FIG. 3 also comprises various monitoring means, means for yieldably biasing the stop 121 and many other features of the apparatus of FIGS. 1 and 2.

Each pressure-responsive valve 17 can comprise, for example an amplifier unit of the type VL 34 H 50 (manufactured by the Firm Festo, German Federal Republic) in combination with a 3/2-way valve of the type 0820222502 (manufactured by the Firm Bosch, German Federal Republic).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting commodities, particularly stacks of paper sheets and the like, comprising a first conveyor arranged to advance successive commodities in a first direction and having a discharge end; a second conveyor arranged to advance commodities in a second direction substantially at right angles to said first direction and having a receiving end; a transfer conveyor adjacent said discharge end and said receiving end and arranged to receive commodities from said first conveyor and to advance the commodities in one of said directions, said transfer conveyor comprising an endless foraminous band having an upper reach for reception of commodities from said first conveyor; means for intermittently driving said transfer conveyor in said one direction; and pneumatic lifting means activable to at least partially raise the commodities off said transfer conveyor, said lifting means comprising nozzles disposed beneath said upper reach of said endless foraminous conveyor and activatable to direct streams of compressed gaseous fluid upwardly through said upper reach while said driving means is deactivated.

2. The apparatus of claim 1, wherein said lifting means includes a series of successively activatable lifting units disposed one after the other in said first direction, and means for activating successive lifting units of said series while said first conveyor advances a commodity beyond said discharge end so that successive increments of such commodity are caused to levitate while advancing onto the transfer conveyor.

3. The apparatus of claim 1, wherein said one direction is said second direction.

4. The apparatus of claim 1, further comprising means for generating signals on arrival of commodities at said discharge end, and means for activating said lifting means in response to signals from said signal generating means.

5. The apparatus of claim 1, wherein said one direction is said second direction and said nozzles form several rows extending in substantial parallelism with said second direction and being spaced apart from each other in said first direction.

6. The apparatus of claim 5, wherein said endless band has rows of apertures and each of said nozzles registers with one of said apertures when said driving means is idle.

7. The apparatus of claim 5, wherein said lifting means further comprises a source of pressurized gaseous fluid and a discrete valve for each row of nozzles, each of said valves being connected with said source and being operable to admit pressurized fluid to the nozzles of the respective row.

8. The apparatus of claim 7, wherein said lifting means further comprises a master valve interposed between said discrete valves and said source, and further comprising means for opening said master valve in response to advancement of a commodity beyond the discharge end of said first conveyor.

9. The apparatus of claim 8, wherein said rows of nozzles form a series of successive rows disposed at different distances from said discharge end and the valves for successive rows are operative to admit gaseous fluid to the nozzles of the respective rows when at least some nozzles of the preceding row in said first direction are overlapped by a commodity which advances in said first direction.

10. The apparatus of claim 1, wherein said one direction is said second direction and further comprising a stop for commodities which levitate above said transfer conveyor, and means for activating said driving means on engagement of a commodity with said stop.

11. The apparatus of claim 10, wherein said stop is yieldable in said first direction and is moved in said first direction by a commodity levitating above said transfer conveyor, said actuating means including means for activating said driving means in response to movement of said stop through a predetermined distance in said first direction.

12. The apparatus of claim 1, wherein said transfer conveyor slopes downwardly in said first direction.

13. The apparatus of claim 1, wherein said one direction is said first direction and said driving means includes means for jointly driving said first conveyor and said transfer conveyor in said first direction, and further comprising an additional conveyor arranged to move commodities off said transfer conveyor and onto said second conveyor while said transfer conveyor is idle.

14. The apparatus of claim 13, wherein said additional conveyor includes a pusher which is reciprocable in and counter to said second direction.

* * * * *